April 15, 1969     L. T. LEE     3,438,609
MILK INLET
Filed Dec. 2, 1966     Sheet 2 of 2
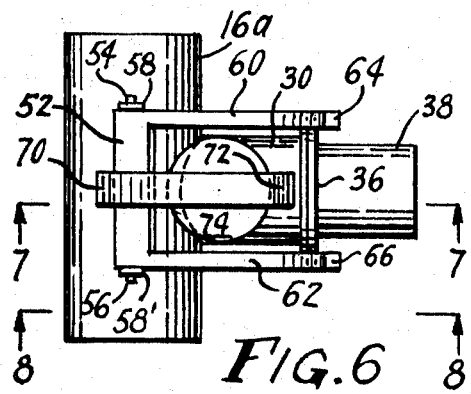
FIG. 6
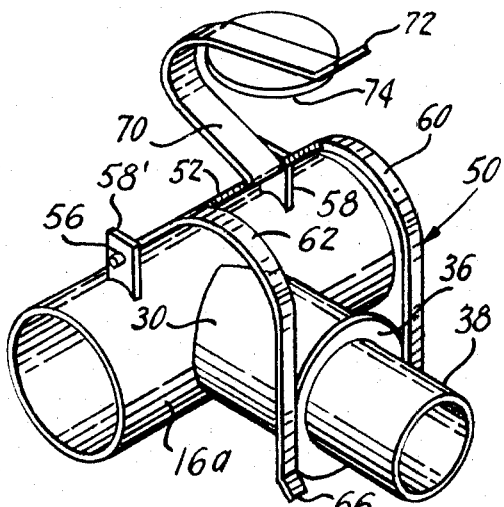
FIG. 5
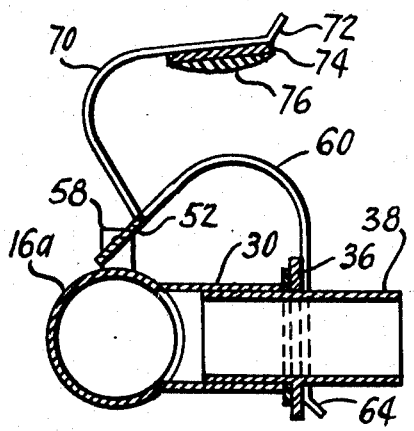
FIG. 7
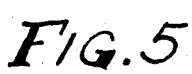
FIG. 8
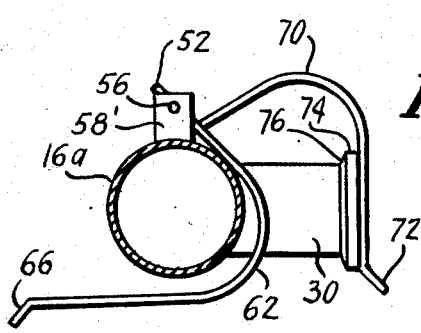
INVENTOR.
LLOYD T. LEE
BY 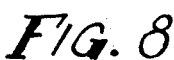
ATTORNEYS.

United States Patent Office 3,438,609
Patented Apr. 15, 1969

3,438,609
MILK INLET
Lloyd T. Lee, Holmen, Wis.
(818 S. 3rd St., La Crosse, Wis. 54601)
Filed Dec. 2, 1966, Ser. No. 598,702
Int. Cl. F16k 51/00; A01j 5/00
U.S. Cl. 251—145        6 Claims

ABSTRACT OF THE DISCLOSURE

A vacuum milk manifold T having a plain cylindrical inlet sleeve which receives a cylindrical nipple having a collar thereabout, the collar being sealed to the sleeve by a resilient gasket and connected to a flexible hose, the nipple being held in the sleeve by a pivoted retaining member which carries a closure cap on an arm for closing the sleeve when the nipple is removed.

Background

Field of the invention.—This invention relates to milking parlor manifolds which are conventionally permanently installed for distributing vacuum to milking stalls and carrying milk from the milking stalls to a collection and treatment facility. In particular, this invention relates to a manifold T, a nipple for insertion in the T and a combination cap and holding device secured to the T.

Description of the prior art.—Manifolds which perform the function of the present invention are known in the prior art. Such manifolds conventionally have threaded connectors between the nipple and the T or may have comparatively complex mechanical interconnections. Since it is of the greatest importance to maintain strict cleanliness in the handling of milk and because cleanliness in the environment is extremely difficult, it is important that the manifold and the nipple for connection thereto be easily cleaned and easily and quickly disconnected. While manifolds known in the prior art have generally accomplished the latter purpose, frequently the connect and disconnect mechanism is so complicated that it is difficult or impossible to properly clean. The object of this invention is to provide a milk inlet manifold connection which has a minimum of structure, which is easily connected and disconnected, and which is easily cleaned and maintained in a sanitary condition.

Summary

This invention is directed to a milk manifold having a plurality of T's each of T's being simply a cylindrical inlet sleeve communicating with the main manifold, the cylindrical inlet sleeve being totally free of structure which may contain or prevent removal of dirt. An insert nipple is received in the inlet sleeve, the insert nipple comprising simply a plain cylindrical member having one power extension extending outwardly from the periphery thereof. The flange is maintained in sealed relation with the end of the inlet sleeve by a resilient gasket. In one form of the invention, a pivoted retainer is secured to the manifold having a pair of arms which engage the flange to hold the nipple in the sleeve and, carried on an arm, a cover for closing the inlet sleeve when the nipple is removed from the sleeve.

Brief description of the drawing

FIGURE 5 is a perspective view of the manifold T of this invention further including a retaining clip for holding the nipple in position and for closing the T when the nipple is removed;

FIGURE 6 is a top plan view of the invention as shown in FIGURE 5;

FIGURE 7 is an end view in partial cross-section showing the retaining member and the closure cap taken substantially along lines 7—7 as shown in FIGURE 6; and FIGURE 8 is an end view taken substantially along lines 8—8 in FIGURE 6 showing the retaining member with the closure cap in the closed position sealing off the inlet sleeve of the manifold.

Description of the preferred embodiments

Figure 1:
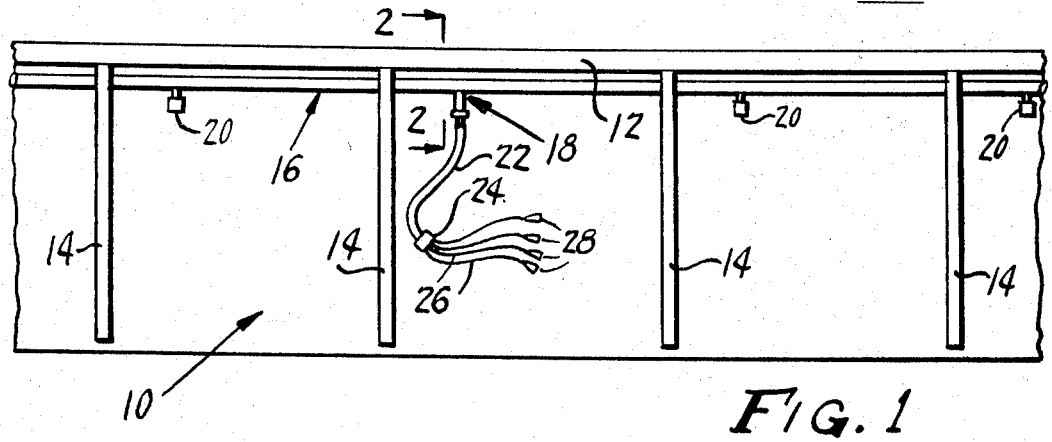
FIGURE 1 is a top plan view of a milking parlor showing the fixed manifold and the milk inlet connector of the present invention.

With reference now to the figures in detail, the invention comprises in a milking parlor 10 having a wall 12 and partitions 14, a fixed main manifold conduit 16 for carrying milk under vacuum from a milk source, such as a cow, to a milk treatment facility. The manifold comprises a plurality of T outlets 18 which may be covered by caps 20.

A flexible hose 22 interconnects header 24 from which individual tubes 26 extend to teat cups 28. It will be understood that this arrangement is merely generally indicative of a milking machine which may be of any conventional type.

Figure 2:
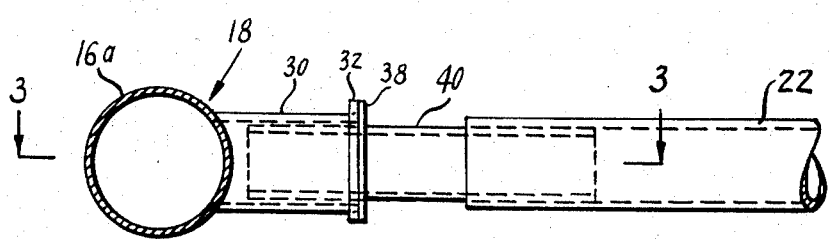
FIGURE 2 is a side view, in partial cross-section, of the milk inlet of the present invention taken along lines 2—2 of FIGURE 1 in the direction of the arrows.
Figure 3:
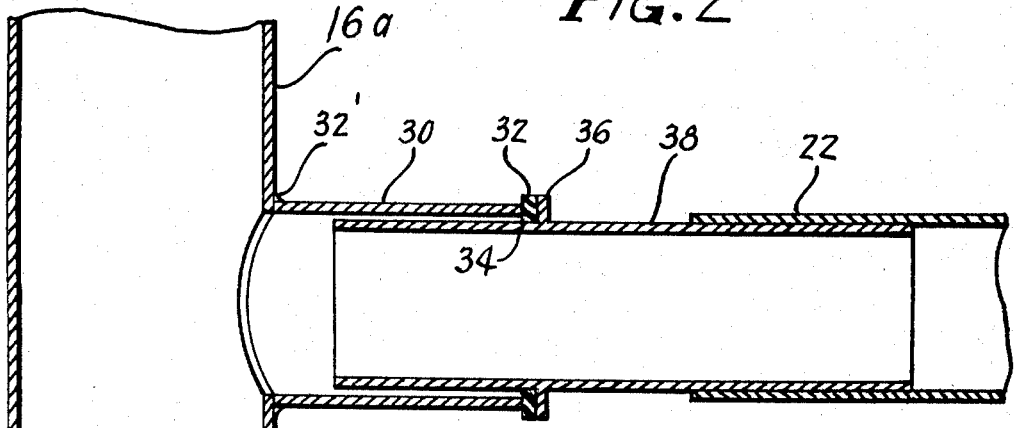
FIGURE 3 is a top view in cross-section of the milk inlet connector of the present invention taken substantially along lines 3—3 of FIGURE 2 in the direction of the arrows.
Figure 4:
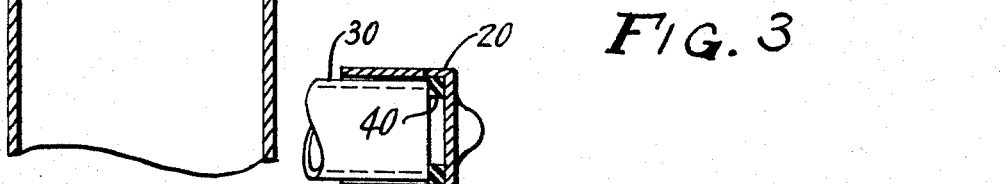
FIGURE 4 is a view in partial cross-section of a cap which may be conveniently used to cover the milk inlet portion of the manifold.

With reference now to FIGURES 2 and 3 in particular, the milk manifold comprises at least one cylindrical inlet sleeve 30 communicating with the main manifold conduit 16 and having its exterior end circumference lying in a plane perpendicular to the sleeve axis. A resilient gasket 32 which may be resiliently deformed at 34 and a collar 36 from a seal between the inlet sleeve 30 and an insert nipple 38 which is received interiorly of the inlet sleeve 30. The insert nipple 38 may be either temporarily or permanently inserted into flexible hose 22. As shown in FIGURE 4, a cap 20 with a resilient cap gasket 40 may be slipped over the inlet sleeve 30 during periods of nonuse.

It will be noted that the resilient gasket 32 is tightly fitted on the circumference of the insert nipple and extends circumferentially outwardly to sealably engage the exterior end of the inlet sleeve 30. The rigid collar extends from the periphery of the insert nipple between the resilient gasket and the flexible hose for transmitting a force uniformly upon all points of the resilient gasket to form a tight vacuum seal.

It will be apparent that the milk inlet coupling of the present invention may be quickly and easily made. When the use is ended, the flexible hose 22, the insert nipple 38, and the resilient gasket 32 are removed and may be thoroughly washed and sterilized in the wash room of the milking parlor by conventional techniques. The stationary portion of the coupling has a minimum of curves, cavities and corners and may be easily and quickly cleaned and sterilized in place. Cap 20 may be placed over the inlet sleeve to maintain it in a clean condition. Since insects, which frequently are present in and around the dairy installations, particularly flies, cannot reach the interior of the inlet sleeve 30, the only portion to contact the insert nipple is maintained in a clean, sterile condition. Conventional cleaning techniques for the main manifold may be used.

In one preferred embodiment of the invention, cap 20 may be replaced by a combination retaining member and cap which is now described. The retaining member and cap combination 50 comprises a cross member 52 which, in one embodiment, may include extension pins 54 and 56 which are received in apertured uprights 58 and 58' which extend upwardly from manifold 16a. This engagement of pin extensions 54 and 56 provides a pivotal mounting for the retaining and closure member 50. Extending forwardly from cross member 52 are arms 60 and 62 which are upwardly turned at the ends at 64 and 66 and which, as shown in FIGURE 5, may engage collar 36 to hold nipple 38 in sleeve 30. Arms 60 and 62 are preferably shaped in the form of an open U having a generally arcuate midsection connecting to straight portions together, one of the straight portions extending to the cross bar 52 and the other straight portion engaging collar 36. Collar 50 is preferably made of a resilient spring steel or similar material. Thus it will be seen that when nipple 38 is inserted in sleeve 30, the retaining member may be pivoted downwardly to engage collar 36 and hold it in position. Normally, of course, the sleeve will be held in position so long as a vacuum is applied to the manifold but it is desirable to have a retaining member to prevent the nipple from falling out when vacuum is not applied to the manifold.

In combination with arms 60 and 62 there is a third arm 70 which is generally shaped similarly to the arms 60 and 62 but extends upwardly from the cross member 52 and may be substantially perpendicular to the flat portions of arms 60 and 62 which interconnect with cross member 52. At the other end of the generally U-shaped arm 70 is a closure disc 74 which has a resilient pad 76 thereon. The end of the arm may be turned up for ease in handling as shown at 78.

Referring back now to arms 60 and 62, it will be noted that they are spaced apart from each other at a distance greater than the diameter of sleeve 30. Thus, when collar 36 on nipple 38 is not in the position shown in FIGURE 5, that is when nipple 38 is not in the sleeve, the arms 60 and 62 will move past the end of sleeve 30 and under the manifold pipe 16a, as shown in FIGURE 8, and closure cap 74 with its resilient cushion 76 will be received over the end of sleeve 30 and form a closure therefor.

The simplicity of construction of the closure and of the nipple and T permit easy cleaning of the manifold. In addition, the pivot points for the closure and retaining member 50 are remote enough from the actual connection between the nipple and the sleeve that there is little chance of contamination from the pivot. In any event, the pivot connection is easily broken by "springing" the resilient cross member 52 to remove the closure which may then be cleaned in a sink and disinfected as desired.

In addition to the simplicity of the design which permits ease of cleaning, it will be apparent that the manifold with its associated T and closure and retaining member may be quickly, easily, and economically manufactured.

I claim:
1. In a milking parlor, the combination comprising:
   a fixed main manifold conduit for carrying milk under vacuum from a milk source to a milk treatment facility;
   at least one cylindrical inlet sleeve communicating with the manifold conduit, said sleeve having its exterior end circumference perpendicular to the sleeve axis;
   an insert nipple received in the inlet sleeve at one end;
   a resilient gasket tightly fitted on the circumference of the insert nipple and extended circumferentially outwardly to sealably engage the exterior end of the sleeve;
   a flexible hose tightly fitted at one end over the other end of the insert nipple;
   a rigid collar extending from the periphery of the insert nipple between the resilient gasket and the flexible hose for selectively transmitting force uniformly upon all points of the resilient gasket;
   a resilient retaining member;
   means pivotally mounting the retaining member on the manifold conduit for selective engagement with the collar on the nipple to hold the nipple in the sleeve;
   a closure cap; and
   means securing the closure cap to the retaining member for pivotal movement therewith for selectively covering the inlet sleeve when the nipple is not received therein.

2. The invention of claim 1 wherein:
   the means securing the closure cap to the retaining member comprises a resilient closure support arm.

3. In a milking parlor, the combination comprising:
   a fixed main manifold conduit for carrying milk under vacuum from a milk source to a milk treatment facility;
   at least one cylindrical inlet sleeve communicating with the manifold conduit, said sleeve having its exterior end circumference perpendicular to the sleeve axis;
   an insert nipple received in the inlet sleeve at one end;
   a resilient gasket tightly fitted on the circumference of the insert nipple and extended circumferentially outwardly to sealably engage the exterior end of the sleeve;
   a flexible hose tightly fitted at one end over the other end of the insert nipple;
   a rigid collar extending from the periphery of the insert nipple between the resilient gasket and the flexible hose for selectively transmitting force uniformly upon all points of the resilient gasket;
   a resilient retaining member;
   means pivotally mounting the retaining member on the manifold conduit for selective engagement with the collar on the nipple to hold the nipple in the sleeve;
   a pair of resilient retaining arms relatively spaced apart a distance greater than the exterior diameter of the sleeve and less than the diameter of the collar; and wherein
   the retaining member mounting means is arranged and constructed to permit the retaining arms selectively to pass on respective sides of the sleeve.

4. The invention of claim 3 wherein the retaining member further comprises:
   a closure cap; and
   means securing the closure cap to the retaining member for pivotal movement therewith for selectively covering the inlet sleeve when the nipple is not received therein.

5. The invention of claim 4 wherein:
   the means securing the closure cap to the retaining member comprises a resilient closure support arm.

6. In a milking parlor, the combination comprising:
   a fixed main manifold conduit for carrying milk under vacuum from a milk source to a milk treatment facility;
   at least one cylindrical inlet sleeve communicating with the manifold conduit, said sleeve having its exterior end circumference perpendicular to the sleeve axis;
   an insert nipple received in the inlet sleeve at one end;
   a resilient gasket tightly fitted on the circumference of the insert nipple and extended circumferentially outwardly to sealably engage the exterior end of the sleeve;
   a flexible hose tightly fitted at one end over the other end of the insert nipple;
   a rigid collar extending from the periphery of the insert nipple between the resilient gasket and the flexible hose for selectively transmitting force uniformly upon all points of the resilient gasket;
   a pair of relatively spaced apart apertured uprights on the main manifold disposed in a line perpendicular to the axis of the inlet sleeve;
   a resilient cross member disposed between the uprights;
   a pair of pin extensions on the ends of the cross member received in the apertures in the uprights pivotally mounting the cross member between the uprights;

a pair of generally U-shaped resilient retaining arms extending from the end portions of the cross member, said retaining arms being spaced apart a distance greater than the external diameter of the sleeve for selectively engaging the collar on the nipple when the nipple is received in the sleeve and straddling the sleeve when the nipple is not received therein;

a resilient generally U-shaped closure arm extending from the cross member intermediate the retaining arms and at an angle relative thereto; and a closure member carried on the closure arm for covering the end of the sleeve when the nipple is not received in the sleeve.

References Cited

UNITED STATES PATENTS

| | | | |
|---|---|---|---|
| 1,488,042 | 3/1924 | Gonsouland | 251—147 |
| 1,709,751 | 4/1929 | Shipley | 285—197 |
| 2,725,892 | 12/1955 | Gallistel | 251—145 |
| 2,763,459 | 9/1956 | Anderson | 251—147 |
| 2,783,771 | 3/1957 | Thomas | 251—146 |
| 3,010,478 | 11/1961 | Buck et al. | 251—146 |
| 3,010,739 | 11/1961 | Boudreau | 251—146 |
| 3,055,385 | 9/1962 | Tieken | 251—145 |

M. CARY NELSON, *Primary Examiner.*

W. R. CLINE, *Assistant Examiner.*